Oct. 7, 1930.  V. V. McARTOR  1,777,930
ADJUSTABLE DISTRIBUTOR
Filed Nov. 1, 1929
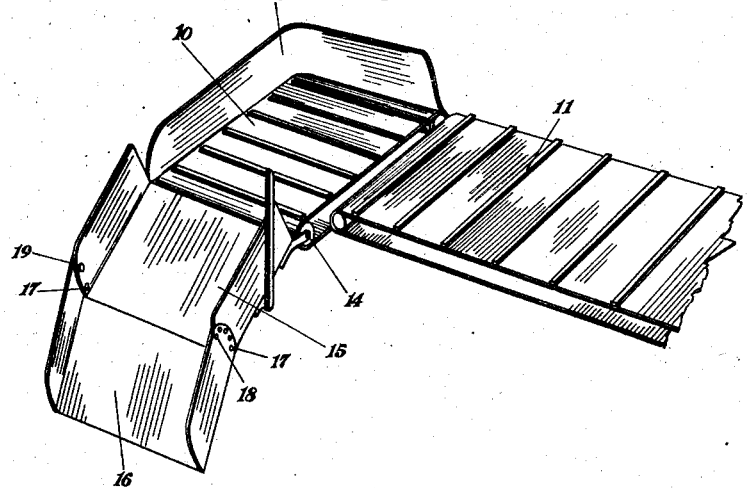
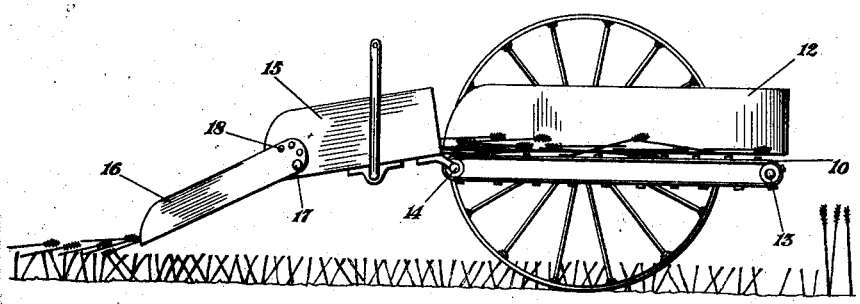
V. V. McArtor  Inventor
By Emil F. Lange
Attorney Patented Oct. 7, 1930

1,777,930

UNITED STATES PATENT OFFICE

VERNIE VANCE McARTOR, OF GRANT, NEBRASKA

ADJUSTABLE DISTRIBUTOR

Application filed November 1, 1929. Serial No. 404,100.

My invention relates to adjustable distributors for depositing headed or cut grain in a windrow on the stubble.

Its primary object is the provision of a device for receiving the grain from the grain platform and for depositing the grain in a windrow on the stubble where it is allowed to cure before being gathered by a "pickup" machine preparatory to separation.

Another of my objects is the provision of a device which may be attached to a header or combine for effecting the distributing of the cut grain in a windrow in the rear of the header or combine.

Another of my objects is the provision of a device for windrowing the cut grain, the device having adjustable features so that the grain may be deposited in the most effective way for curing it regardless of the height of the standing grain and regardless of the topography of the field.

More specifically, my object is the provision of an attachment including a cross conveyor which is adapted to be secured at the inner end of the grain platform of a header or combine and having a rearwardly and downwardly extending chute which is adjustable to various inclinations.

Having in view these objects and others which will be pointed out in the following description, I will now refer to the drawings, in which Figure 1 is a view in perspective showing my adjustable distributor and its relation to the grain platform of the header or conveyor.

Figure 2 is a view in side elevation of my adjustable distributor and showing also the bull wheel of the header or combine.

My adjustable distributor includes a transverse conveyor 10 which is adapted to be secured to the header or combine at the inner end of the grain platform 11 as shown in Figure 1. The conveyor 10 is provided with slats similar to those of the platform 11, and the upper rung of the conveyor 10 is adapted to receive the cut grain from the platform 11 and to convey the cut grain toward the rear. The frame of the cross conveyor 10 is provided with a guard 12 for confining the cut grain during its movement over the cross conveyor 10. The cross conveyor 10 is preferably of the endless type and it has front and rear rollers 13 and 14, the roller 13 being the driven roller.

The distributor is preferably in the form of a sectional chute. The upper section 15 of this chute is hingedly connected to the axis of the roller 14. Its upper end is adapted to receive the cut grain from the cross conveyor 10 and to carry it rearwardly and downwardly to be delivered into the lower section 16 of the chute. Both sections 15 and 16 of the distributing chute are preferably in U form having upwardly extending side walls to confine the movement of the grain through the sections of the chute. The lower section 16 of the chute is provided with ears at its upper or forward end which overlap the side walls of the chute 15. The two sections are pivotally connected together by means of pivot pins 17. The ears of the section 16 are each provided with a plurality of apertures 18 concentric with the pivots 17, and the links of the section 16 are each provided with a single aperture 19. The section 16 may thus be raised or lowered so that its lower end is at the desired height above the ground and this position may be fixed by means of pins passing through the apertures 18 and 19, the height being determined largely by the height of the stubble.

The purpose of the device is to enable the operator to cut the grain at a time when the grain is not in prime condition for the separator. By attaching the device to the harvesting machine, the operator is enabled to deposit the grain in a windrow in the rear of the implement where it is allowed to cure on the stubble, after which it may be gathered by a pickup machine connected with a combine which thrashes the grain. The adjustable feature of the chute makes it possible to distribute the grain in the most orderly manner possible instead of merely throwing it on the stubble as is frequently done by implements not equipped with my adjustable distributor. When the cut grain is dropped from a considerable height above the stubble it tends to scatter out and to be lost at the base of the stubble where it can not effectively be reached by the "pickup" machine. On the other hand, a chute which is not adjustable as to height is very apt to drag over the stubble thus breaking the stubble irregularly so that the cut grain is very apt to become lost and wasted in the stubble. The present device overcomes both of these difficulties by adjusting the chute 16 so that its delivery end is immediately above the surface of the stubble, thus delivering the cut grain gently on the platform formed by the stubble. The adjustable distributor may be made in any desired width but in actual practice it has been found that a width of from eighteen to twenty-four inches is the most desirable width of the swath or windrow. The adjustment of the chute section 16 affords ample latitude in the angle to which the grain is carried downwardly to the stubble so as to prevent scattering of the grain beyond the edges of the swath or windrow. This angle may also vary between wide limits but the most effective inclination is approximately a thirty degree inclination with respect to the surface of the field.

Having thus described my invention in such full, clear, and exact terms that its construction and operation will be readily understood by others skilled in the art to which it pertains, what I claim as new and desire to secure by Letters Patent of the United States is:

1. An attachment for harvesters having cutting mechanism and a movable platform in the rear of the cutting mechanism, said attachment including a frame adapted to be secured to the harvester at the delivery end of the movable platform thereof, a conveyor within said frame, said conveyor being transverse to the platform of the harvester, and a rearwardly and downwardly inclined chute for depositing the grain on the stubble in a windrow in the rear of the harvester, said chute comprising a pair of sections hingedly connected together whereby said sections may be angularly adjusted relative to each other, and means for latching said two sections in any position of adjustment.

2. In combination, a harvester having a transversely arranged cutting mechanism and an endless conveyor in the rear of said cutting mechanism, a second endless conveyor at the delivery end of the first said endless conveyor and adapted to receive the cut grain from the first said conveyor and to convey the cut grain rearwardly in a narrow stream, and a rearwardly and downwardly inclined chute for depositing the cut grain on the stubble in a windrow in the rear of the harvester.

3. In combination, a harvester having a transversely arranged cutting mechanism and an endless conveyor in the rear of said cutting mechanism, a second endless conveyor at the delivery end of the first said endless conveyor and adapted to receive the cut grain from the first said conveyor and to convey the cut grain rearwardly in a narrow stream, an L-shaped wall at the forward end of said second conveyor and extending across the outer side thereof, and a rearwardly and downwardly inclined chute for depositing the grain on the stubble in a windrow in the rear of the harvester, said chute comprising a pair of sections hingedly connected together whereby said sections may be angularly adjusted relative to each other, and means for latching said two sections in any position of adjustment.

In testimony whereof I affix my signature.

VERNIE VANCE McARTOR.